United States Patent
Westphal et al.

(10) Patent No.: US 6,444,288 B1
(45) Date of Patent: Sep. 3, 2002

(54) CONDUIT PROFILE

(75) Inventors: Hans-Jürgen Westphal, Hof; Hartmut Schinzel, Münchberg; Klaus Dittmann, Rehau, all of (DE)

(73) Assignee: REHAU AG & Co., Rehau (DE)

(*) Notice: Subject to any disclaimer, the term of this patent is extended or adjusted under 35 U.S.C. 154(b) by 0 days.

(21) Appl. No.: 09/509,684

(22) PCT Filed: Nov. 28, 1998

(86) PCT No.: PCT/EP98/07696

§ 371 (c)(1),
(2), (4) Date: Mar. 30, 2000

(87) PCT Pub. No.: WO99/29002

PCT Pub. Date: Jun. 10, 1999

(30) Foreign Application Priority Data

Nov. 28, 1997 (DE) .................................. 297 21 105 U

(51) Int. Cl.⁷ ................................................. B32B 3/26
(52) U.S. Cl. ...................... 428/122; 428/174; 428/179; 428/182
(58) Field of Search ................................ 428/122, 174, 428/179, 182; 174/68.3

(56) References Cited

U.S. PATENT DOCUMENTS 3,479,568 A    11/1969  Shapiro et al.
5,844,169 A  * 12/1998  Uemura et al. ............. 174/68.3

FOREIGN PATENT DOCUMENTS

| DE | 1 590 128 | 4/1970 |
| DE | 2 128 588 | 10/1972 |
| DE | 23 04 038 | 12/1975 |
| DE | 91 03 649 | 8/1991 |
| DE | 94 04 062 | 3/1994 |
| EP | 0 384 486 | 8/1990 |
| FR | 1398654 | 3/1965 |
| GB | 2 268 837 | 1/1994 |

* cited by examiner

Primary Examiner—Alexander S. Thomas
(74) Attorney, Agent, or Firm—Venable; Gabor J. Kelemen

(57) ABSTRACT

The invention relates to an extruded conduit profile which has a U-shaped cross-section and is comprised of a base and limbs, said limbs being shaped on the base as one piece. The profile also has a covering part which can be connected to one free end of the limb. The invention provides a material-saving production of conduit profiles while completely adhering to the required stability at the same time. To this end, at least the wall thickness of the base of the U-shaped conduit profile is reduced, and impressions which reinforce are placed in a section by section manner inside said base which has a reduced wall thickness.

2 Claims, 2 Drawing Sheets

CONDUIT PROFILE

The invention relates to an extruded conduit profile, which has a U-shaped cross section and comprises a base and limbs, said limbs being shaped on the base as one piece. The profile also has a covering part, which can be connected to the free ends of the limbs.

Such conduit profiles are widely known. They serve as installation conduits for the installation of electrical lines or mains, are used when such lines are being installed in walls or ceilings, serve as parapet conduits and have many other applications.

A conduit profile of such type is know from German patent 77 02 117. Here, an installation conduit is described comprising a U-shaped housing for receiving wires, cables, lines, hoses and suchlike having a covering part for covering the housing. In the free end areas of the sidewalls of this installation conduits slots are formed which extend in longitudinal direction and serve for the placing of retaining clips.

With respect to such conduit profiles, it is the endeavour of manufacturers and users to keep the wall thickness of the profiles at the lowest possible level. Due to the required stability during manufacturing and installation, this endeavour is relatively limited.

Therefore, it is suggested in DE 82 31 934 U1 to form the base and/or the sidewalls and/or the covering or the conduit profile at least partially as hollow chamber profile. This suggestion assumes that hollow chamber profiles generally have a high stability and are if low weight so that the desired material saving can be achieved in such a manner. However, it has been ignored that such hollow chamber profiles have two continuous walls with interconnected webs serving as space retainers so that the material saving, if any is achieved after all, is relatively low.

It is the object of the present invention to provide a material saving manufacturing of such conduit profiles and at the same time to retain the required stability. It is suggested according to the invention that at least the base of the U-shaped conduit profile has a reduced wall thickness and that impressions serving the reinforcement in sections are placed inside this wall thickness-reducing base.

The invention draws on the ample knowledge gained, for example, in the manufacturing of corrugated pipes. Here, substantial reductions in the cross section of the pipe walls have been achieved by forming corrugations so that corrugated pipes could be manufactured at substantially less material expenditure at comparative strength relative to compact pipes. At the core of the invention is a type of transversal corrugation for generating transversally extending ribs, at least in the base area of the U-shaped conduit profile. According to the invention, this transversal corrugation can be manufactured by means of stamping, punching, via vacuum link chains or by means of differing thrust during extrusion.

It is essential for its operation that the transversal corrugations are placed in the wall areas having a weakened cross section. Hereby, it can be of advantage that limbs which have a thicker cross section relative to the base extend slightly into the base with the wall thickness in the deflection area to the base and that the impressions extend from the wall thickness of the deflection area. The strength extending from these impressions runs into the thickened sidewall, here preferably into the radius area.

Impressions in the form of a cross or T or such like can be placed into the wall thickness-reduced base in addition to the corrugated shape or instead thereof. Star shapes, circles, polygons etc can be placed into the wall thickness-reduced base. The impressions can be provided in planar shape or reinforced in prism shape at the plane of maximum load, ie the bending moment.

It is particularly advantageous if, in addition to the undulated impressions, circular formations are placed into the base, which contribute to a further increase in stability. Such circular formations can be designed with a raised edge whereby, for example, a screw head of an attachment screw can be sunk into the such formed interior space. Thereby, in addition to the stability increase, a damage of the lines which are to be pulled into the lumen of the conduit profile over a, for example, sharp-edged screw head, is prevented.

The impressions according to the invention can be placed into the base and/or into the limbs and/or the covering part. In addition to reinforcement characteristics, transversal corrugations in the covering, as long as they are placed sheet-like, can serve as raised base on the covering for advertisements such as company names, system names, marks of conformity etc.

The impressions according to the invention can be placed into the corresponding wall thickness-reduced wall areas and spaced at arbitrary distance. The impressions can also be provided as a hybrid, namely once as transversal corrugations crosswise to the longitudinal axis of the conduit profile in the base, in the limbs and/or the covering and additionally in round, cross-, star-, T-shaped and polygonal impressions.

An embodiment of the conduit profile according to the invention is illustrated schematically in the drawing.

Figure 1:
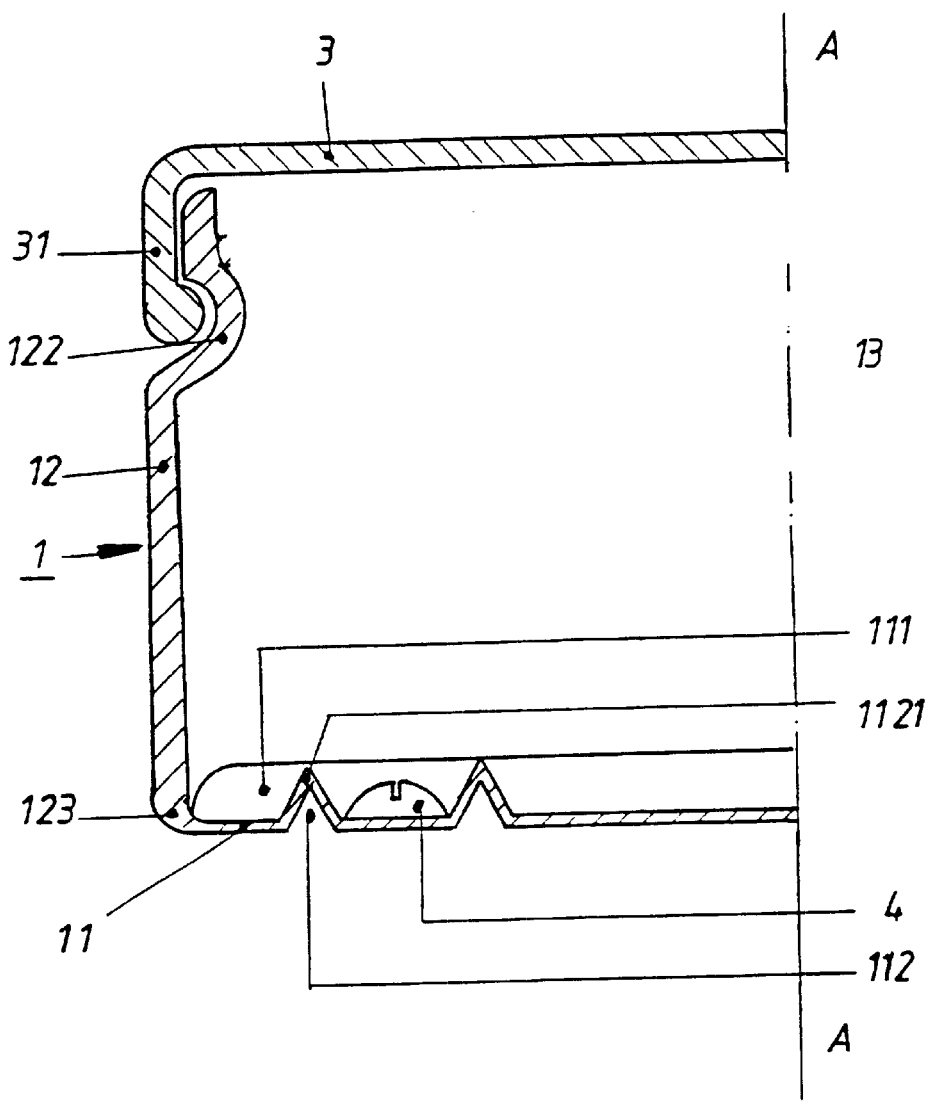
FIG. 1 shows a cross section of a conduit profile with retaining clips and covering part.

FIG. 1 shows the cross section of a conduit profile 1 with covering part 3 in section along the middle line A—A. The conduit profile 1 consists of a wall thickness-reduced base 11 and the shown limb 12 which corresponds to the limb (not shown) on the other side of the conduit profile 1 in a laterally reversed manner.

The crosswise extending impression 111 is placed into the thickness-reduced base 11. This impression 111 runs in the side area to the limb 12 into the deflection area 123 to the base 11 so that he impression 111 extends from the wall thickness of the deflection are a 123.

A circular impression 112 is also placed into the base 11 in addition to the impression 111. This circular impression 112 limits a circular contortion with its circulating edge 1121 which corresponds to the height of the impression 111 and surrounds the screw head 4 of an attachment screw in a protective manner.

Figure 2:
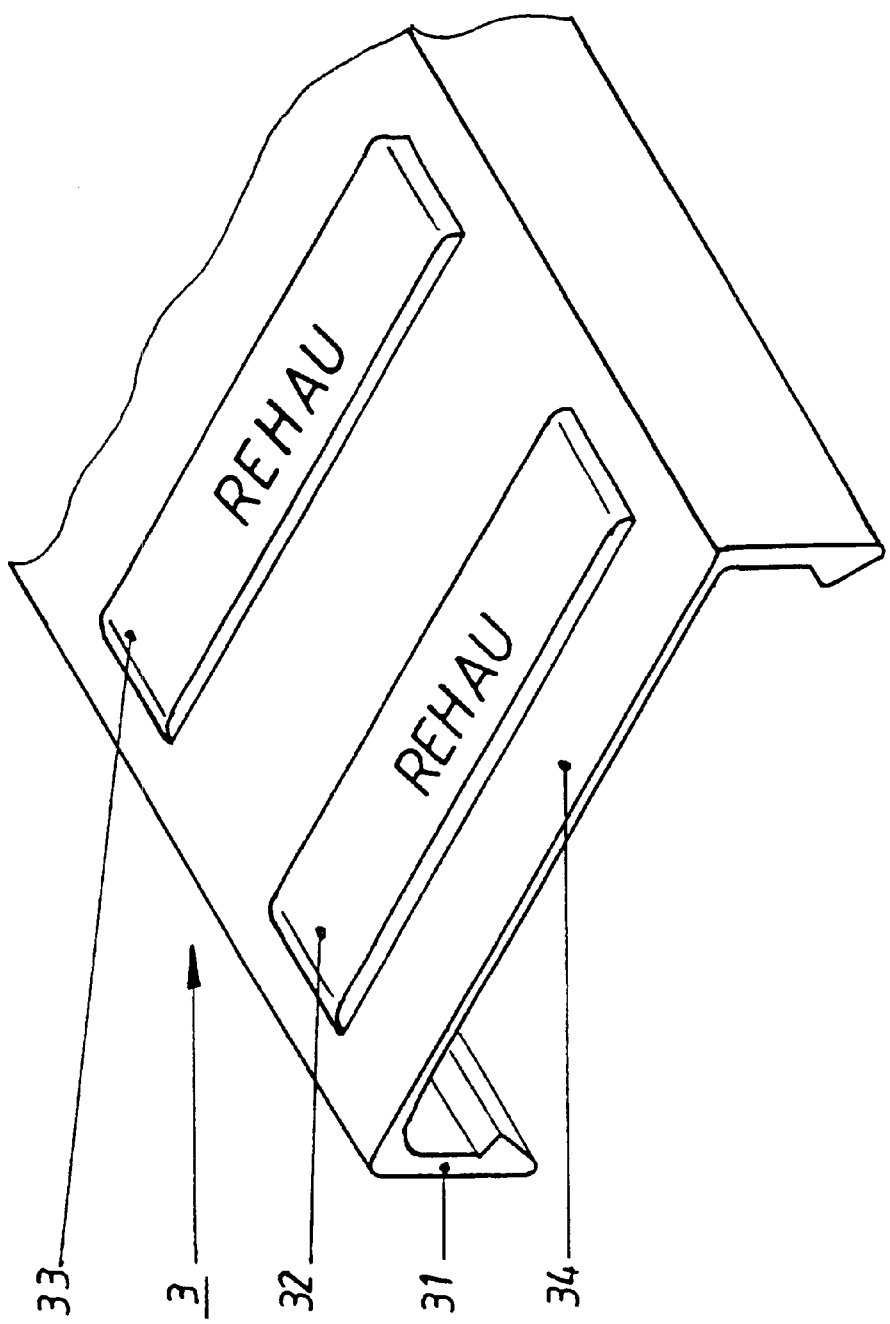
FIG. 2 shows a perspective view of the covering part.

FIG. 2 shows the perspective view of the covering part 3 with the transverse impressions 32, 33 placed in sections. These impressions 32, 33 are placed, according to the description relative to the base 11 with the impression 111 into the side areas at the transition between the thicker retaining limb 31 and the wall thickness-reduced base 34 of the covering 3 in such a manner, that the impressions 32, 33 extend outwards in a raised manner. In this shape, they serve as base for an advertising imprint.

In FIG. 2, the impressions 32, 33 can also be pushed toward the lumen 13 of the conduit profile 1 so that corresponding transversal indentations are generated on the base surface 34 of the covering 3. The impression described relative to the base 11 of the other embodiment can of course also be placed in the base 34 of the covering part 3 in addition to the transversal impression or by themselves.

What is claimed is:

1. A cross-sectionally U-shaped profile comprising a base having a width and limbs integrally formed on said base;

said limbs having a free end connectable to a covering part; said base having a reduced wall thickness; further comprising reinforcing impressions provided in said base in sections; said impressions extending transversely across said width.

2. A cross-sectionally U-shaped profile comprising a base and limbs integrally formed on said base; said limbs having a free end connectable to a covering part; said base having a reduced wall thickness; further comprising reinforcing impressions provided in said base in sections; said limbs being cross-sectionally thicker than said base; further comprising a deflection area where said limbs merge into said base; said limbs extending slightly into said deflection area with their thicker cross section; said impressions extending from a wall thickness of said deflection area.

* * * * *